United States Patent
Stevens

(10) Patent No.: US 8,734,529 B2
(45) Date of Patent: *May 27, 2014

(54) DISTRIBUTION CHANNEL LOSS PROTECTION FOR ELECTRONIC DEVICES

(75) Inventor: Jon Stevens, Vancouver (CA)

(73) Assignee: Absolute Software Corporation, Vancouver, British Columbia ( * ) Notice: Subject to any disclaimer, the term of this patent is extended or adjusted under 35 U.S.C. 154(b) by 178 days.

This patent is subject to a terminal disclaimer.

(21) Appl. No.: 13/584,680

(22) Filed: Aug. 13, 2012

(65) Prior Publication Data

US 2013/0042329 A1   Feb. 14, 2013

Related U.S. Application Data

(63) Continuation of application No. 13/280,138, filed on Oct. 24, 2011, now Pat. No. 8,241,369, which is a continuation of application No. 12/099,081, filed on Apr. 7, 2008, now Pat. No. 8,062,380.

(60) Provisional application No. 60/922,081, filed on Apr. 5, 2007.

(51) Int. Cl.
*G06F 11/00*   (2006.01)
*H04L 9/00*   (2006.01)

(52) U.S. Cl.
USPC ............ 726/35; 726/27; 726/28; 726/29; 726/30; 713/194

(58) Field of Classification Search
USPC .......................................................... 726/35
See application file for complete search history.

(56) References Cited

U.S. PATENT DOCUMENTS

2006/0021007 A1 *  1/2006  Rensin et al. .................. 726/2

* cited by examiner

*Primary Examiner* — Longbit Chai
(74) *Attorney, Agent, or Firm* — Knobbe, Martens, Olson & Bear, LLP

(57) ABSTRACT

An electronic device, prior to entering a distribution channel, is equipped with a loss prevention client which permits limited use of the device until correct authentication is provided by a legitimate purchaser. By permitting limited use before authentication, the device remains both useful to a legitimate purchaser and valuable to a thief. While allowing operation in the possession of a thief, options can be provided to permit tracking of the device or to allow proper purchase of the device.

21 Claims, 4 Drawing Sheets

DISTRIBUTION CHANNEL LOSS PROTECTION FOR ELECTRONIC DEVICES

PRIORITY CLAIM

This application is a continuation of U.S. application Ser. No. 13/280,138, filed Oct. 24, 2011 now U.S. Pat. No. 8,241,369, which is a continuation of U.S. application Ser. No. 12/099,081, filed Apr. 7, 2008 (now U.S. Pat. No. 8,062,380), which claims the benefit of U.S. Provisional Application No. 60/922,081, filed Apr. 5, 2007. The disclosures of the aforesaid applications are hereby incorporated by reference.

FIELD OF THE INVENTION

This invention relates to methods and apparatus for deterring the unauthorized use and theft of electronic devices, particularly those in a distribution channel, and optionally also to the implementation of a tracking agent for the recovery of stolen devices. In conjunction with this, it relates to the provision of a convenient method of activating an electronic device by a legitimate user. As is discussed in greater detail below, such electronic devices may include, without limitation, processor controlled devices such as computers, gaming devices, communications devices and audio devices, as well as systems that include devices containing processors, such as photocopiers.

BACKGROUND OF THE INVENTION

Electronic devices may be stolen from a distribution channel, for example while they are being shipped to or between warehouses, retail outlets, wholesalers or businesses, or while they are on display in a store or in storage. Since the theft or unauthorized use of such devices in a distribution channel generally occurs prior to the purchase or delivery of the devices to the ultimate purchaser or consumer, the devices are typically stolen before a customer has had any opportunity to register for a loss prevention service. As one consequence of such theft and misuse, stores have a reduced ability to place computers and other valuable electronic devices on shelves, which limits their ability to make sales.

Various solutions addressing the problems associated with the theft and misuse of electronic devices in a distribution channel have been proposed. However, these prior-known solutions generally fail to adequately accommodate the timely resolution of difficulties that a legitimate initial purchaser of the electronic device may have, the ability of a bona fide secondary purchaser (of a previously stolen device) to take suitable remedial actions, or the tracking and recovery of stolen devices.

By way of example, U.S. Pat. No. 7,266,849 to Gregory, et al., issued on Sep. 4, 2007, describes a method for deterring unauthorized use of an electronic device. The method comprises installing security data in a protected storage area, installing a security routine operable to check for the security data, and prompting a user for identity information if the security data is found, before permitting use of the device. In one implementation, the device is shut down if the identity information is incorrect, and manufacturer contact information may be displayed before shutting down. This system may be inconvenient to a genuine owner of a new electronic device. For example, on inputting a wrong password or no password, a genuine owner will not be able to operate the device, and it may be not possible at that instant to find the correct password or contact the manufacturer or vendor.

U.S. Pat. No. 7,131,001 issued on Oct. 31, 2006 to Johnson describes an apparatus for enabling the functionality of previously dormant components within a computer or other device. The components are either active or dormant depending on whether a correct password has been entered. There is no middle ground where a component is temporarily active.

U.S. Pat. No. 6,654,890 issued on Nov. 25, 2003 to Girard relates to the wireless locking of a computer platform to discourage theft as the platform is transported in a distribution channel. This system involves an automated wireless transmission of an authentication key into a computer at the factory. Authentication keys are sent separately to the intended recipients. There is no facility to use the computer if the wrong authentication key is received, if it is damaged, or if it has been misplaced.

U.S. Pat. No. 5,892,906 issued on Apr. 6, 1999 to Chou et al. describes an apparatus and method for discouraging computer theft. It requires that a password be supplied to the computer before the BIOS routines can be completely executed. The security function within the BIOS includes an administration function which permits the computer to be either placed in a locked or unlocked state, the latter not requiring any password.

U.S. Pat. No. 6,832,320 issued on Dec. 14, 2004 to Broyles III et al., discloses an ownership tag in a special area of memory of a computer system, which identifies an owner by displaying the ownership tag during initialization. It is stored in a flash memory, which is very difficult to remove from the system board, or to modify without administrator-level access.

U.S. Pat. No. 6,553,495 issued on Apr. 22, 2003 to Johansson et al. relates to anti-theft blocking circuits to prevent components within computers from being stolen or swapped without authorization. It includes a blocking circuit integrated with each of the components to be protected and a memory for storing an identity code for each blocking circuit.

SUMMARY

In accordance with aspects of the disclosed subject matter, an initial grace period following the purchase of an electronic device is provided during which a user of the device may have nearly unhindered use of it for a selected suitable period of time, such as a few days. In general, full functionality of the device is provided during the initial grace period, which is long enough for the user to reasonably resolve any password problems and to enter a correct unlock code that is provided either at the time of purchase or obtained after purchase. Furthermore, since the electronic device remains fully useable for its normal purposes during the initial grace period (unlike a typical cell phone, which is generally useless unless first activated), a thief or a third party who in good faith purchases the device from the thief will appreciate that the device has value, and will be less likely to summarily discard the device. In accordance with further aspects of the disclosed subject matter, means may additionally be provided whereby a person in possession of an electronic device that has previously been stolen from a distribution channel may purchase the device from its rightful owner. Continued use of a stolen device during the grace period may also optionally facilitate theft tracking.

Following the initial grace period, if a correct unlock code is not entered or received electronically from a remote transmitter operated by or on behalf of the owner or vendor, the device is rendered essentially useless for its normal purposes, but can be switched on for just long enough for the correct password still to be entered by a legitimate user or for theft recovery procedures to be initiated or continued in the case of possession by a thief. Theft recovery procedures typically involve a tracking agent (of a sort known to those of skill in the art—see below) in the device making a call to a monitoring center. During communication of such a call, the monitoring center may optionally pass an instruction to the agent to disable or delete a persistent Loss Protection Client ("LPC") in order to allow the agent to notify the monitoring center of its location more frequently.

The theft recovery and asset tracking procedures and systems contemplated herein may include or interact with one or more of the various components, features and services that have previously been disclosed and patented in the U.S. and in other countries, and commonly assigned to Absolute Software Corporation. See, for example, U.S. Pat. Nos. 5,715,174; 5,764,892; 5,802,280; 6,244,758; 6,269,392; 6,300,863; and 6,507,914, which are hereby fully incorporated by reference.

In embodiments of the disclosed subject matter, the persistent LPC is installed at the time of manufacture of the electronic device, and challenges the end user for an unlock code on every boot. If the unlock code is not provided, the LPC provides reminders on how to get the unlock code, which could be from a website or by phone. Once a valid unlock code is entered (either during or after the grace period), the computer is fully activated and the LPC is disabled or deleted. A thief will not be able to get an unlock code and will ignore the messages. After the grace period, the electronic device will be automatically logged off or shut down a few minutes after every boot, rendering the device almost useless. If the thief reinstalls the operating system of the device to try and remove the LPC, the persistent module installed with it will restore it.

In time, stores selling computers and other devices with the installed LPC will suffer less theft than other stores not using the LPC.

In one preferred embodiment of the claimed subject matter, an electronic device comprising an output interface, a data entry interface and a loss protection client is provided. The loss protection client is configured to: (1) cause the device to signal (via the output interface) an unlock code prompt after the device is switched on or "booted"; (2) accept via the data entry interface the input of one or more input codes during a first period of time after the device is switched on; (3) disable itself if at least one of the input codes is identical to an unlock code; and (4) permit normal operation of the device for a second period of time starting after the first period of time if the input codes are all different from the unlock code, or if no input code is entered during the first period of time.

Preferably, the loss protection client is further configured to: (5) periodically signal the unlock code prompt during a grace period (starting when the device is turned on) and accept the input of one or more further input codes if the input codes previously entered did not match the unlock code. If at least one of the further input codes entered during this grace period is identical to the unlock code, then the loss protection client may disable or delete itself. However, if none of these further input codes are identical to the unlock code, then the loss protection client may power down, log off or reboot the device, or it may display a message via the output interface instructing the user of the device to return the device to the retailer thereof or to contact the police, or providing the user an option to purchase the device or to claim a reward, In another preferred embodiment, the claimed subject matter provides a method for protecting an electronic device from theft or misuse, especially whilst in a distribution channel. The method comprises the steps of: (1) installing a loss protection client in the device; (2) signaling an unlock code prompt on the device after the device is switched on or "booted"; (3) accepting in the device the input of one or more input codes during a first period of time after the device is switched on; (4) disabling the loss protection client if at least one of the input codes is identical to an unlock code; and (5) permitting normal operation of the device for a second period of time starting after the first period of time if the input codes are all different from the unlock code, or if no input code is entered during the first period of time.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the following drawings, like reference numerals designate like or similar parts.

DETAILED DESCRIPTION

Terminology

Figure 1:
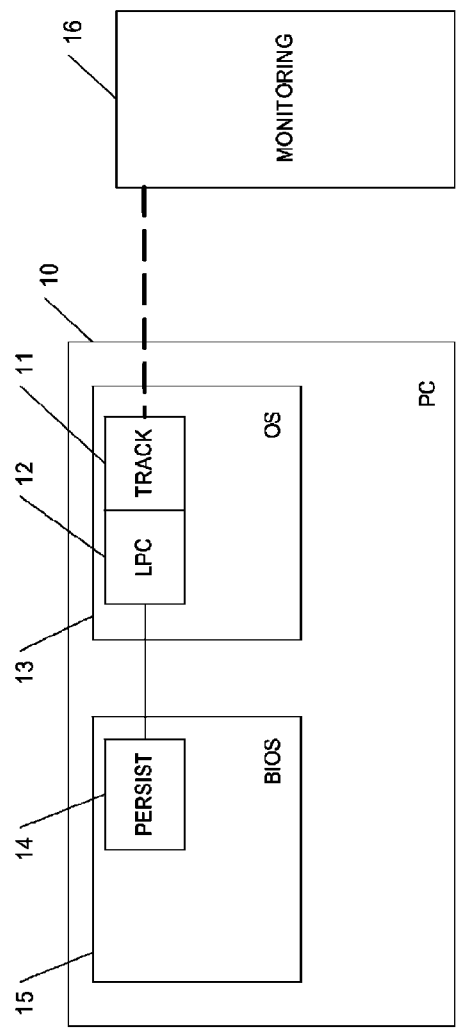
FIG. 1 is a schematic functional block diagram of an apparatus in accordance with an embodiment of the disclosed subject matter, as incorporated in a personal computer.

Transaction ID—means a transaction reference that a retailer provides to a purchaser of a computer or other electronic device to be protected. It may be provided on a receipt, for example, or on another medium.

Activation Code—means the code that a purchaser obtains from a call center or website as a result of the purchaser providing a valid transaction ID to the call center or website.

Input Code—means the code that a user inputs into the electronic device in response to a prompt from the device for the input of an unlock code, and may or may not be the same as the unlock code.

Unlock Code—means the code that a legitimate user must enter into the electronic device in order to have full, unhindered use of it. Depending on the embodiment, the unlock code may be the activation code or the transaction ID.

Switch on—in one sense means the action taken by a user to initiate operation of an electronic device. In the case of a computer or other electronic device, it may be interpreted as booting up. As is known, there may be a time interval between the moment of the user action to switch on the device and the moment the device actually reaches full operating condition. The moment of switch on in an alternate sense means the instant of time the electronic device has booted up. Both interpretations are possible herein. Time periods measured from switch on may in practice be measured from the moment of user action, the moment of completed boot up, a moment during boot up, or a moment close in time to switch on relative to the time periods to be measured.

First switch on—means the first time an electronic device is switched on after it enters a distribution channel. The device is considered to enter the distribution channel the moment an LPC is installed and any testing of the device and/or LPC has been completed, such that no further switch on is intended until the device is in a purchaser's possession. First switch on could be the first time a legitimate purchaser switches it on or authorizes a third party to switch it on, or it could be the first time a thief switches it on.

The present description is of the best presently contemplated mode of carrying out the subject matter disclosed and claimed herein. The description is made for the purpose of illustrating the general principles of the present invention and should not be taken in a limiting sense. The present invention can find utility in a variety of implementations without departing from the scope and spirit of the invention, as will be apparent from an understanding of the principles that underlie the invention. The scope of the invention is best determined with reference to the appended claims.

The detailed descriptions that follow are presented partly in terms of methods or processes, symbolic representations of operations, functionalities and features of the subject matter disclosed and claimed herein. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated. It will be further appreciated that the line between hardware and software is not always sharp, it being understood by those skilled in the art that software implemented processes may be embodied in hardware, firmware, or software, in the form of coded instructions such as in microcode and/or in stored programming instructions.

Overview of the Apparatus

By way of example and not limitation, the subject matter disclosed and claimed herein is described in detail below in relation to computer distribution at the retail level. The inventive concept is, of course, applicable for loss prevention at all levels in a distribution channel (e.g., manufacturer, shipper, warehouse, customs, wholesalers, resellers, distributors, etc.) and in relation to other sorts of electronic devices.

The presently disclosed and claimed apparatus comprises a Loss Protection Client ("LPC"), which resides in the electronic device to be protected. As noted above, the electronic device may be a personal computer, a laptop computer, a gaming console, a personal digital assistant, a Blackberry™ or any other electronic device comprising a processor. It could also be an audio or visual entertainment device, medical equipment, or any other system or device that includes a computer, including a dedicated electronic tracker for securing electronic or non-electronic assets such as motor vehicles, boats, and goods in transit. The electronic device includes a data entry interface, such as a keyboard, keypad, touch screen or other facility for inputting data such as via a transmitter (such as an infra-red remote control or other wireless transmitter), and in some embodiments also includes as an output interface a visible electronic display. In other embodiments, the electronic device does not itself include a visible electronic display, but may be connectable to a visible electronic display, or may provide information to a user using other conventional sorts of output interfaces such as audible output signals or printouts or the like.

The LPC is in the form of computer readable instructions in or on a computer readable medium and operates within the operating system of the electronic device, for example of a laptop computer, and may be installed into the laptop by the computer manufacturer before it leaves the factory. It may alternately be installed in a processor in the computer.

Additionally, a persistent agent to support the LPC is installed during the computer manufacturing process. This agent may be located in the BIOS, for example, and may be configured to reinstall the LPC in cases where it is damaged, disabled or deleted. Such an event may occur as a result of a thief attempting to reinstall an operating system. Other locations for the persistent agent may be a safe area of a hard disk, such as in a partition gap, or within a central processing unit or other processor in the laptop. The persistent agent may initiate communication with a remote monitoring centre, either directly or indirectly via a tracking agent, and may download code from the monitoring centre sufficient to repair the LPC. The tracking agent may be a Computrace™ Agent supplied by Absolute Software Corporation.

Details of a persistent agent are disclosed in a co-pending U.S. Patent Application now published as U.S. Publication No. US 2005/0216757 (which corresponds to PCT Application Publication No. WO 2006/102399), and in U.S. Publication No. US 2006/0272020, all of which are hereby fully incorporated by reference.

A further benefit of communications between the LPC and a monitoring centre is that updates to the LPC or its settings can be downloaded from the monitoring centre over an internet connection. Other communication links are possible, such as switched communications networks, private and public intranet, radio networks, satellite networks, and cable networks. Also possible are WWAN, WAN, LAN, etc., value-added networks, broadcast networks, cellular networks, and a homogeneous or heterogeneous combination of such networks.

A typical monitoring centre may comprise call servers and software, web servers and web applications, database servers and databases, authentication systems, administrative systems and back end processing systems, and may or may not be staffed. A monitoring center can take calls from host agents over various bearer services such as IP or PSTN, and can identify computers, determine their licensing level and record their attributes and location, install and update software on monitored computers, and set up data-delete services and theft-recovery tools. A monitoring centre can provide a web interface for users to generate reports of their monitored assets and their locations. It may include interfaces with gateways for SMS and may potentially communicate with computers which are switched off but have separately powered security modules.

Each laptop or other electronic device to be protected requires an unlock code. This unlock code may be supplied by the vendor to the purchaser directly in the form of a transaction ID, or it may be retrieved as an activation code by a purchaser providing authentication over a phone line or website. Such authentication information may include a transaction ID present on the receipt. The unlock code is generated by an algorithm based on some local computer attribute such as a serial number, and maybe provided locally at the point of sale, remotely by a phone operator, interactive voice response (IVR) or a website. In order to validate that the user has purchase the machine, the website, IVR or phone operator needs some information from the receipt. Instead of an algorithm, unlock codes may be stored in a lookup table which is accessible to live operators who can lookup the unlock code for each valid purchase.

Exemplary Embodiment

FIG. 1 illustrates an example of the presently disclosed and claimed subject matter embodied in a personal computer 10. Instead of a computer, the presently disclosed and claimed subject matter could be embodied in any electronic device having an output interface such as a display (or connectivity to a display) and a data entry interface such as a keyboard, keypad, mouse, touch screen, remote control, a receiver for transmitted data, etc. The LPC 12 is installed to run from the operating system 13. The LPC operates in conjunction with a tracking agent 11 which communicates with a remote monitoring center 16 over an internet, cellular or satellite connection. A persistent agent 14 installed in the BIOS 15 is configured to detect the presence of the LPC and whether it is fully functional. The monitoring center that the persistent agent communicates with may be a group of one or more computers or servers, and must be capable of sending downloads to the computer to be protected. The monitoring center to which a tracking agent communicates may be the same as or different to the one the persistence agent communicates with. It may comprise one or more servers, or it may be as simple as a computer receiving email messages from the tracking agent.

Optionally, the LPC and tracking agent may be combined, or the LPC may communicate directly with the monitoring center without the implementation of a tracking agent.

Legitimate Purchaser Experience

Figure 2:
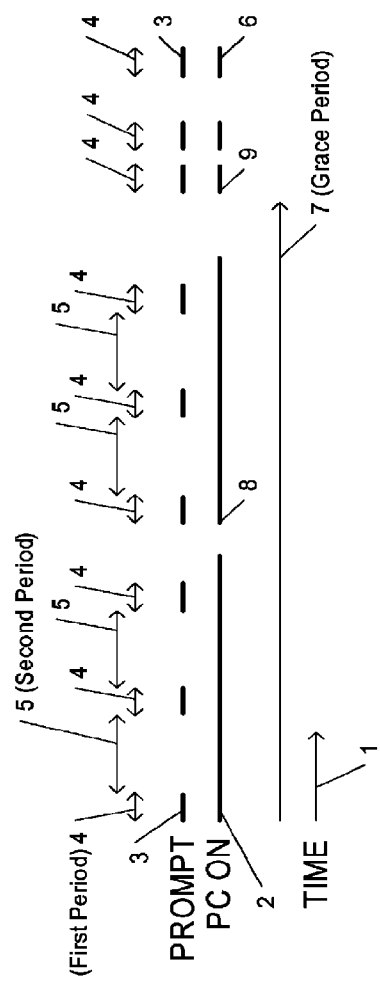
FIG. 2 is a timeline of the functioning of a LPC in accordance with embodiments of the disclosed subject matter.
Figure 3:
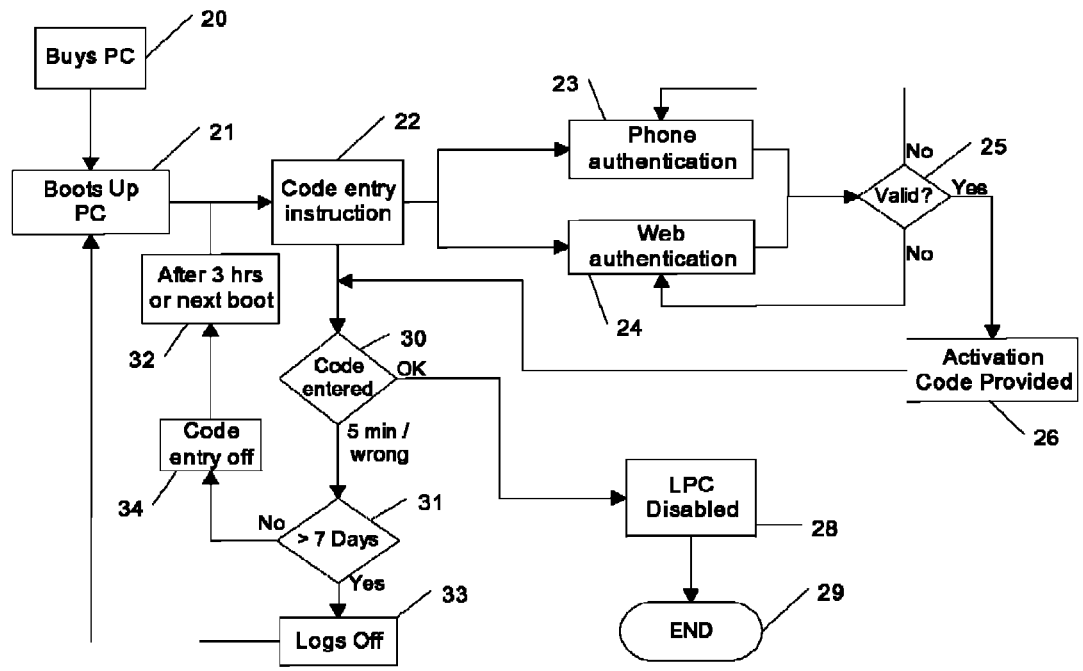
FIG. 3 is a functional flow diagram schematically representing the flow process experienced by a legitimate purchaser of an electronic device in accordance with embodiments of the disclosed subject matter.

FIG. 2 shows a timeline of the functioning of the LPC and FIG. 3 is a functional flow diagram schematically representing the flow process generated by the LPC and experienced by a legitimate purchaser. In step 20 of FIG. 3 a legitimate purchaser buys a PC from a store, and obtains a transaction ID. The transaction ID may be printed on the receipt or may be provided separately. The transaction ID is related uniquely to the purchased PC (or group of PC's bought by the same purchaser), such that a valid transaction ID cannot be used to obtain activation codes for other PC's. The purchaser takes the PC home or to the office and boots it up 21. The LPC causes the screen to display instructions 22 directing the purchaser to obtain an unlock code and to enter it. The display of these instructions is an unlock code prompt.

In this example, the purchaser is directed either to phone a customer service center or to access a specified website, each or both of which may be referred to as a validation center. In this flowchart it is not necessarily assumed that the PC has an internet connection itself. If the purchaser phones the customer service center 23, the call may be attended by a live operator or an IVR machine. In this step the purchaser provides the transaction ID to the customer service center. Note that the purchaser can use any computer to access the specified website 24 to enter the transaction ID and retrieve the activation code.

If the transaction ID is valid 25, thereby providing authentication that the purchaser is legitimately in possession of the PC, an activation code is provided 26 to the purchaser. This may be provided verbally, via machine voice or by display on screen. The purchaser then enters 30 the provided activation code via the data entry interface of the computer, which, if correct causes the LPC to become disabled 28 and allow unhindered activation of the PC at the end 29 of the process.

If the transaction ID is not valid 25, which may be because the transaction ID has been incorrectly provided, or because an incorrect transaction ID has been supplied to the customer, the purchaser is returned to the authentication service center step 23 or website step 24. The purchaser therefore has a second or more chances to provide a correct transaction ID.

If more than a certain time passes 30 before the purchaser obtains and attempts to enter the unlock code in step 22, or if the purchaser enters an incorrect unlock code more than a set number of times, the LPC then checks whether the time passed since the first post-sale boot is less than a certain, predetermined grace period 31. If the grace period has not yet expired, the computer removes the unlock code entry instruction 34, therefore permitting normal operation of the computer. The LPC then passes to step 32 in which it causes, either on the following boot or the passage of a set amount of time, the unlock code entry instruction 22 to display on the computer screen once again. This unlock code prompt may be the same or different to the one previously displayed. Note that during the passage of time 30 and LPC controlled display of the unlock code prompt 22, normal, user-controlled operation of the computer is otherwise permissible.

Following shut down, the purchaser may at any time boot up the computer 21. The LPC works through the process, once again displaying the unlock code entry instruction 22, and giving the purchaser a predetermined time to retrieve and enter the correct unlock code. The purchaser is therefore never denied the opportunity to enter a correct unlock code.

Referring to the timeline of FIG. 2, the direction of time 1 flows from left to right and is not necessarily to scale. In this timeline diagram, the correct unlock code is not entered. The computer is first switched on or "booted" after purchase and is shown to be ON by line 2. At or after boot, the unlock code prompt is displayed 3 for a first period of time indicated by line 4. The display of the prompt is temporary, following which the computer can be used normally for a second period of time 5. The prompt is periodically displayed, as shown by the broken nature of line 3. The computer is turned off and then rebooted at point 8, at which time the prompt is temporarily and repeatedly redisplayed. Following the end of the grace period 7, when the computer is rebooted 9, the prompt is again redisplayed for a first period of time 4, but at the end of this time the computer is switched off. Each subsequent switch on of the computer results in it remaining ON 6 for a shortened duration after which it is powered down.

Although specific time intervals have been given in FIG. 3, the LPC is not limited to these time durations. For example, the allowed duration for the entry of the unlock code 30 may be less than 5 minutes, or more than 5 minutes. For example, it could 10 minutes, 30 minutes or 75 minutes or any other selected suitable duration. The grace period given in step 31 could similarly be more than 7 days or less than 7 days. For example, it could be 3 days, 4.5 days, 10 days or some other selected suitable duration. Furthermore, the duration in step 32 for the periodic reappearance of the unlock code entry instruction 22 may be set to more than 3 hours or less than 3 hours. For example it could be 45 minutes, 2 hours, 5 hours or some other selected suitable duration. The unlock code entry instruction or unlock code prompt can also be redisplayed at regular, irregular, increasing or decreasing intervals; it may be displayed for different lengths of time each time it is redisplayed; or it may be displayed indefinitely or displayed in a window that can be shut by the user at any time.

Thief Experience

Figure 4:
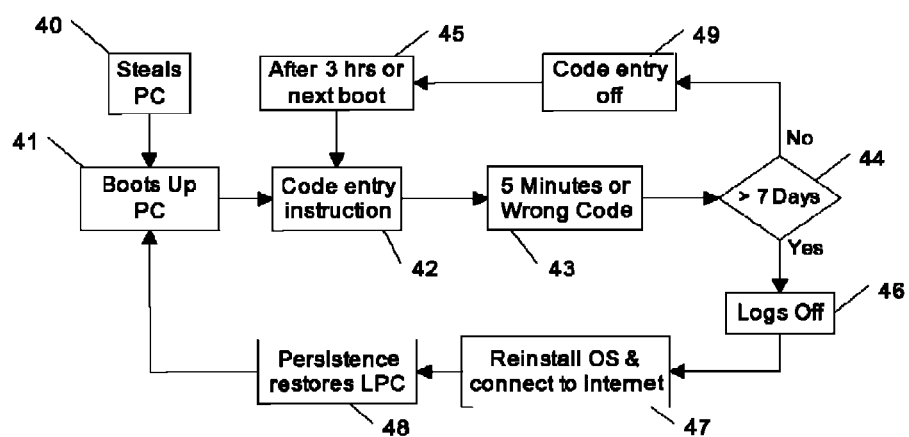
FIG. 4 is a functional flow diagram schematically representing the flow process experienced by a thief or illegitimate purchaser of an electronic device in accordance with embodiments of the disclosed subject matter.

FIG. 4 is a functional flow diagram schematically representing the flow process experienced by a thief or illegitimate purchaser who may have bought the computer from a thief. After stealing the computer 40 the thief boots it up 41 causing the LPC to display the unlock code entry instruction 42 on the screen of the computer. The thief does not have a transaction ID, and is therefore not in a position to authenticate the purchase. The repeated appearance of the popup instructing the user to enter an unlock code reduces the ability of the thief to pass the computer onto a pawn shop or sell to an illegitimate purchaser. After a predetermined time or after a failed attempt to guess an unlock code 43, the LPC checks whether the grace period 44 has passed. If not, the LPC will remove the unlock code entry instruction 49 then cause the computer to display the unlock code entry instruction after every few hours or after every subsequent boot 45. This allows the thief use of the computer without too much inconvenience, reducing the possibility of it ending up in a dumpster, but still permitting a tracking agent to monitor its location, if it is desired to have the tracking agent activated during the grace period.

If, however, the grace period 44 has expired, the LPC logs off the computer 46. At this point, the thief may decide to re-boot the computer, in which case we move to step 41. Repeated re-boots after every five minutes or so make the computer effectively useless. Alternately, and as shown in FIG. 4, the thief therefore decides to reinstall the operating system software 47 and then connect to the internet. The persistence functionality, such as the Computrace™ Persistence Agent, built into the system and resident in the BIOS recognizes the absence of the LPC, and using the connection to the internet, communicates with the monitoring center resulting in the download and reinstallation of an LPC 48. On the following boot up 41, the downloaded LPC operates fully, but in the post-grace period phase, requesting unlock code entry 42 and then entering the repeated re-boot mode. Alternately, depending on an instruction from the monitoring center, whether and how flags for the computer have been set at the monitoring center, or the version of the LPC downloaded, the LPC may allow use of the computer for another grace period or a reduced grace period. As described above, the predetermined durations may be different from those specified in the figure.

Following the initial grace period and during subsequent grace periods the stolen computer may be recovered and the thief caught, if the computer also has a tracking agent which may also be pre-installed in the computer, or another tracking device such as a GPS tracking device, an assisted GPS device, a wireless signal strength tracking device or a triangulation locating device. Such as tracking device, or tracking agent, will contact a remote monitoring center automatically, or send emails automatically to a predetermined email address, at regular, random, or scheduled times. During communication with a monitoring center, the tracking agent provides information relating to the location of the computer or device. While the computer is in the repeated re-boot mode after a grace period has expired, the tracking agent, if installed, can be configured to send location bearing communications to a monitoring center before the computer is logged off.

Optionally, the agent when in communication with the monitoring center may be given an instruction to disable or delete the LPC. This would allow unhindered use of the computer, further reducing the likelihood of it being discarded, and permit a tracking agent to make much more frequent calls into the monitoring center. Increased calls, providing more frequent and up-to date location reporting, may be necessary for more efficient location of the thief and recovery of the computer.

Figure 6:
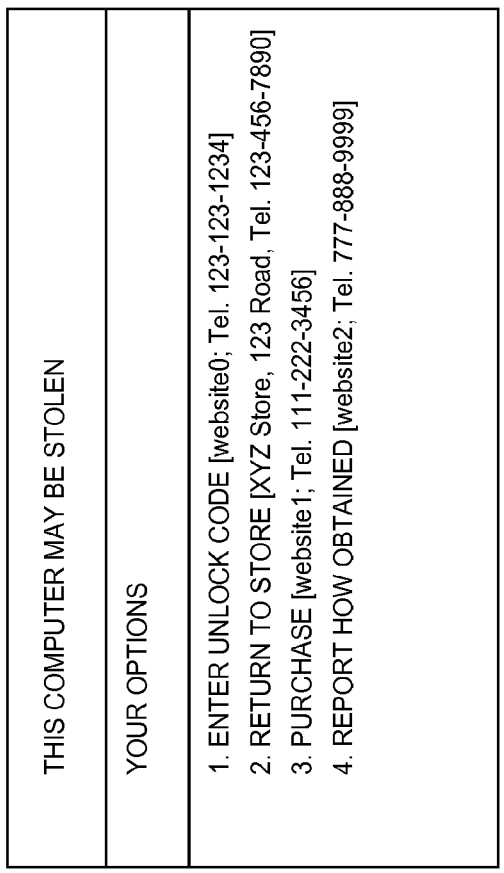
FIG. 6 is a representation of a specimen screen shot of an unlock code prompt that may be displayed following the initial grace period in accordance with embodiments of the disclosed subject matter.

During the repeated re-boot mode, the popup message providing an instruction to obtain and enter an unlock code may additionally be configured to provide a notice as to the name, address and contact number of the store where the computer was supposedly bought from. It may also display a note saying that since the computer has not been officially activated, it may in fact be stolen, and should be returned to the store. A further alternative is to provide an option for purchase of the computer, allowing the thief or other person having illegitimate possession to make good the situation. For a thief this would be an opportunity to return the stolen property to avoid prosecution, or for an innocent purchaser an opportunity to assist in returning the stolen property to the rightful owner, possibly for a reward, or for an innocent purchaser to purchase the stolen computer at perhaps a reduced price so that the store owner can avoid the hassle of restocking the computer and the user having to repurchase another computer at higher regular price. This option may be an online payment processing option, or the display of a phone number for ordering via telephone. The payment is then directed to the store owner from which the computer was stolen. FIG. 6 shows an example of a screen shot of an alternate unlock code prompt that may be displayed following the initial grace period. The options given in FIG. 6 are not hard and fast and can be tailored to suit different embodiments of the disclosed and claimed subject matter.

As well as restoring the LPC, the persistence module may also restore the tracking agent. Further, any communication with the monitoring center may permit upgrades to the agents or modification to the parameters of the agents.

Interaction Between Players and the Loss Protection System

Figure 5:
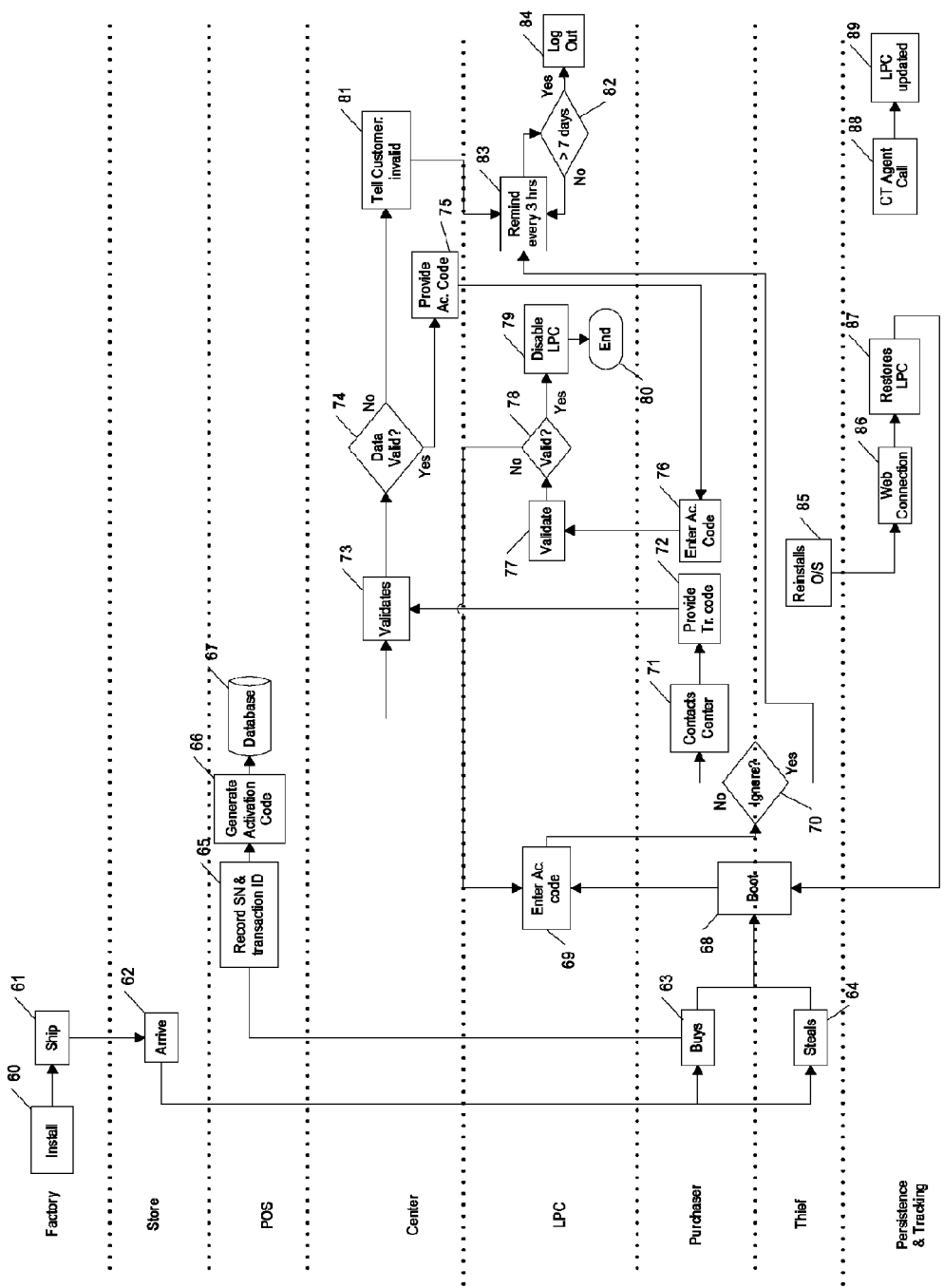
FIG. 5 is a swim lane diagram where each lane corresponds to an actor in accordance with embodiments of the disclosed subject matter.

FIG. 5 shows a swim lane diagram where each lane corresponds to an actor in an exemplary embodiment of the system. The various actors depicted are the factory where the computer is made or assembled, the store where the computer is sold, the point of sales (hereinafter "POS") within the store, the validation center which purchasers contact to obtain unlock codes, the loss protection client (LPC), the purchaser, the thief and the persistence module embedded in the computer.

In the factory computers are manufactured or assembled and installed 60 with the LPC, a persistence agent and a tracking agent. The tracking agent may be a Computrace™ Agent, for example. A sticker may additionally be placed on the computer box to indicate that it is loaded with a theft protection system. The protected computers are then shipped out 61 to arrive 62 at the store where they are intended to be sold. In the distribution channel, the protected computers may be stored temporarily in a warehouse before shipment to a store. Optionally, the serial numbers of the computers are supplied to the store separately or with the shipment. This is not necessary if the serial numbers in the BIOS match the serial numbers in the POS. In the store a purchaser may buy 63 a computer or a thief may steal one 64. If a purchaser buys 63 a computer the store's staff at the POS records the serial number against a transaction ID 65, where the transaction ID relates to the sale. The transaction ID is provided to the purchaser and is also used by the POS to generate an unlock code 66. At the POS the generated unlock code is then stored in a database 67, with the corresponding transaction ID, serial number and date of sale of the computer.

When the purchaser or thief boots up 68 the computer, the LPC operating within the computer causes a popup 69 to be displayed on the computer screen, which gives an instruction to activate the computer. The instruction may indicate that the user has, say, seven days to activate the computer, and give direction on how to activate the computer. For example, the instruction may be to phone a particular number, making sure that the transaction ID is handy. The instruction may alternatively provide a website that the user should visit to activate the computer. The popup also has a field in which the unlock code may be entered.

The user may either ignore or pay heed 70 to the popup instruction. If the user is a purchaser who does not ignore the popup and follows the instruction, the purchaser contacts 71 the validation center. The validation center may be a website, a live operator in a calling center or an interactive voice response system. The purchaser provides 72 the transaction ID to the center which then checks the transaction ID and date of purchase provided to the center in a validation step 73. In this step, the center has access to or has been previously supplied with the corresponding data in the POS database 67.

If the information provided by the purchaser is correct 74, the validation center provides 75 an activation or unlock code to the purchaser who then enters 76 the unlock code on the computer. The LPC validates 77 the entered unlock code against a hash derived from the serial number of the computer, and if the unlock code is valid 78 the LPC disables itself 79 and provides a thank-you message. The LPC may disable itself by deleting itself. The process then ends 80 because the computer has successfully passed through the distribution channel to the purchaser without being stolen. If for some reason the purchaser entered (as the input code) an incorrect unlock code, the LPC will display the popup 69 to allow the purchaser another chance to enter the correct unlock code. The number of retries may be limited to a predetermined number or to the number that can be entered within a limited time period.

If the information provided to the validation center by the purchaser is incorrect 74, the customer is informed 81 that the data is invalid. The LPC then reminds 83 the user every 3 hours by redisplaying the popup 69 instructing the user to obtain and/or enter an unlock code. If seven days pass 82 after the initial boot up, the LPC logs off 84 the user from the computer.

If at step 70 a thief ignores the popup instruction 69 to obtain an activation code, the LPC will display the popup every three hours 83, until a period of seven days have elapsed 82 at which point the thief will be logged off 84.

If the thief then decides to reinstall 85 the operating system, the persistence module within BIOS will, at the next connection to the internet 86, restore 87 the LPC and tracking agent. The persistence module may be embedded in other firmware or hardware location within the computer, such as a peripheral or central processor. At intervals thereafter, the tracking agent (for example a Computrace™ or CT Agent) calls 88 a monitoring center, providing location information of the computer, such as a GPS location, an IP address, a Wi-Fi signal strength field or cellular triangulation data. During any subsequent communication between the tracking agent and the monitoring center, the functionality of the LPC may be updated 89.

If a legitimate user reinstalls the OS after validation, the persistent agent will cause the tracking agent to be reinstalled on connection to the internet, but the LPC will not be reinstalled. This is because the monitoring center keeps a record of whether a particular computer should have an activated LPC, a disabled LPC or no LPC.

Further Variations and Alternative Embodiments

Besides the embodiments of the disclosed and claimed subject matter described above, other features that may be implemented in connection with the loss prevention client include, in addition or in the alternate, the following:

Locking the computer: After the initial grace period, the LPC may be configured to lock down the computer, instead of allowing for a five minute or other duration of "ON" time after booting.

Instead of completely locking a stolen computer upon failure to enter a valid unlock code, a minimal set of functions may remain enabled. For example, the user may be given the web browser function and network access function to allow access to the internet, such that the user may communicate with a remote station to undertake certain remedial actions to gain full access to the computer. Sound, removable media drives and full color operation of the display may be withheld.

Following the grace period, if no unlock code is entered, the purchaser may be given an opportunity to explain the circumstances in which the purchaser obtained the computer. For example, this could be information about the purchaser and information verifying that the purchaser is an innocent purchaser; information about the person, store or thief which sold the computer to the purchaser to assist in law enforcement; etc. The purchaser may then be given limited and/or temporary access to the computer pending further investigation relating to the circumstance and/or status of the computer (e.g., verification that it is indeed a stolen property).

Upon failure to enter a valid unlock code, no lock-out of a stolen computer is undertaken and the grace period is effectively indefinitely extended. The loss protection client either directly and/or with the support of the persistent agent in a stealthy manner, initiates a tracking agent to contact a remote monitoring station to allow recovery of the stolen computer while the thief continues to use the stolen computer. The tracking client may be preinstalled on the computer, or downloaded and installed on the stolen computer by the persistent agent when needed, which may be following the expiration of the grace period.

Upon failure to enter a valid unlock code offline, communication with a remote station is initiated via the internet. The user is given another opportunity to obtain and/or enter a valid unlock code. The lock out of a stolen computer may be subsequently instructed by the remote monitoring station, by sending an instruction to the persistent agent to activate a lock-out client. Further utilities may be performed, such as data delete.

Changed time limits: Optionally, during the revival of the LPC, the monitoring center may be configured to instruct the LPC to operate with different predetermined time limits. This may be for one or all of the durations to enter an unlock code, the duration between successive prompts to enter an unlock code and the duration of the grace period. For example, the grace period may be reduced from 7 days to 3 days, or even to zero. As another example, the unlock code entry instruction may be reconfigured to appear every 30 minutes rather than every 3 hours.

Up-selling: After a purchaser has successfully entered an unlock code, one or more popups could appear, in which a purchaser is made an offer or offers to purchase a theft recovery software license, or other related or unrelated purchase which may or may not be downloadable. The user may be given an opportunity to subscribe to monitored tracking and recovery services using the preinstalled tracking agent, and/or other services that are supported by the persistent agent on the computer.

Unlock code: The unlock code can be provided in several different ways. It can be generated from an algorithm based on the PC serial number, in store. The unlock code may then be provided on a receipt to a purchaser of the computer. An interne connection is not then required to activate the PC. The computer may be either activated in the store or at home.

Lost transaction ID: As the database 67 stores a number of data points relating to the purchase of a computer, if the transaction ID is lost, the purchaser can still provide the serial number and date of purchase to the validation center in order to get the activation or unlock code. A record would only exist in the database if the computer was actually bought, and so thieves should not be able to obtain an activation or unlock code this way.

The process and system of the presently disclosed and claimed subject matter has been described above in terms of functional modules in block diagram format and flow processes. It is understood that, unless otherwise stated to the contrary herein, one or more functions may be integrated in a single physical device or a software module in a software product, or one or more functions may be implemented in separate physical devices or software modules at a single location or distributed over a network, without departing from the scope and spirit of the present invention. It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art applying ordinary skill can practice the present invention without undue experimentation.

While the presently disclosed and claimed subject matter has been described in relation to computer distribution at the retail level, it will be apparent to those of skill in the art that the inventive concept is applicable for loss prevention at all levels in a distribution channel and in relation to other sorts of electronic devices. It will further be apparent to those of skill in the art that various modifications and improvements may be made without departing from the scope and spirit of the invention. Accordingly, it is to be understood that the invention is not to be limited by the specific illustrated embodiments, but only by the scope of the appended claims.

The invention claimed is:

1. A system for protecting electronic devices from distribution channel theft, comprising:
 a database; and
 a computer system comprising one or more computers, said computer system configured with executable code capable of causing the computer system to at least:
 store, in the database, records of a plurality of electronic devices, each of which should have an activated loss protection client installed thereon; and
 during communication with a suspect one of said electronic devices having had its loss protection client improperly disabled, transmit a replacement loss protection client to the suspect electronic device;
 wherein each loss protection client comprises executable code capable of causing an electronic device to:
 during an initial grace period that begins with a first switch on after entering a distribution channel, operate in a first mode in which the user is repeatedly prompted to enter an unlock code and in which the electronic device is substantially fully functional;
 in response to receiving a valid unlock code, operate in a fully functional, second mode, in which the user is not prompted to enter said unlock code; and
 after the grace period expires without entry of a valid unlock code, operate in a third mode in which at least one anti-theft action is performed including: (1) transmitting data regarding its location to a remote system to facilitate recover from a possible thief, or (2) impeding use of said electronic device.

2. The system of claim 1, wherein the executable code further directs the computer system to store, in the database, records of electronic devices that have had their loss protection clients legitimately disabled.

3. The system of claim 1, wherein the executable code further directs the computer system to, during communication with said suspect electronic device, determine whether the suspect device has had its loss protection client improperly disabled.

4. The system of claim 1, wherein the database is configured to store records of electronic devices that have been sold subsequent to having a loss protection client installed thereon.

5. The system of claim 1, wherein the computer system is further configured to, via communications with an electronic device that is reported as stolen, perform one or more of:
 transmitting a request to provide location information;
 transmitting a request to provide location information more frequently;
 setting up a theft recovery tool;
 transmitting a data delete instruction; and
 electronically locking the stolen electronic device.

6. The system of claim 1, wherein the computer system is further configured to, via communications with an electronic device that is reported as stolen:
 determine that the reportedly-stolen electronic device has an operable loss protection client; and
 transmit an instruction to disable said operable loss protection client.

7. The system of claim 1, wherein the computer system is configured to communicate with said electronic devices via an agent installed on each electronic device.

8. The system of claim 1, wherein the computer system is configured to generate a report of the electronic devices and their locations.

9. The system of claim 1, wherein the computer system is configured to communicate with a suspect electronic device that is switched off, the suspect electronic device comprising a separately powered security module.

10. The system of claim 1, wherein the at least one anti-theft action includes the electronic device transmitting data regarding its location to the computer system.

11. The system of claim 1, wherein the at least one anti-theft action includes impeding use of the electronic device.

12. A computer-implemented method for protecting electronic devices from distribution channel theft, comprising:
 storing, in a database, records of a plurality of electronic devices each of which should have an activated loss protection client installed; and
 during communication with a suspect one of said electronic devices having had its loss protection client improperly disabled, transmitting a replacement loss protection client to the suspect electronic device;
 wherein each loss protection client comprises executable code capable of causing an electronic device to:
 during an initial grace period that begins with a first switch on after entering a distribution channel, operate in first mode in which the user is repeatedly prompted to enter an unlock code and in which the electronic device is substantially fully functional;

in response to receiving a valid unlock code, operate in a second mode, in which the user is not prompted to enter said unlock code and in which the electronic device is fully functional; and after the grace period expires without entry of a valid unlock code, operate in a third mode in which at least one anti-theft action is performed including: (1) transmitting data regarding its location to a remote system to facilitate recover from a possible thief, or (2) impeding use of said electronic device;

said method performed by a computer system that comprises one or more computers.

13. The method of claim 12, wherein the method further comprises storing, in the database, records of electronic devices, selected from said plurality, having had their loss protection clients legitimately disabled.

14. The method of claim 12, further comprising, via communication with said suspect electronic device, determining, by the computer system, that the suspect device has had its loss protection client improperly disabled.

15. The method of claim 12, further comprising storing records of electronic devices that have been sold subsequent to having a loss protection client installed thereon.

16. The method of claim 12, further comprising, by said computer system via communications with said suspect electronic device, performing one or more of:
    transmitting a request to provide location information;
    transmitting a request to provide location information more frequently;
    setting up a theft recovery tool;
    transmitting a data delete instruction;
    electronically locking the stolen electronic device;
    determining that the stolen electronic device has an operable loss protection client; and
    transmitting an instruction to disable an operable loss protection client.

17. The method of claim 12, wherein the method comprises, by said computer system, communicating with said electronic devices via an agent installed on each electronic device.

18. The method of claim 12, further comprising, by the computer system, communicating with a suspect electronic device that is switched off via a separately powered security module of the suspect electronic device.

19. One or more non-transitory computer readable media comprising executable code that directs a computing system comprising one or more computers to at least:
    access records of a plurality of electronic devices, each of which should have an activated loss protection client installed; and
    during communication with a suspect one of said electronic devices having had its loss protection client improperly disabled, transmit a replacement loss protection client to the suspect electronic device;
    wherein each loss protection client comprises executable code capable of causing an electronic device to:
    during an initial grace period that begins with a first switch on after entering a distribution channel, operate in first mode in which the user is prompted to enter an unlock code and in which the electronic device is substantially fully functional;
    in response to receiving a valid unlock code, operate in a fully functional, second mode, in which the user is not prompted to enter said unlock code; and
    after the grace period expires without entry of a valid unlock code, operate in a third mode in which at least one anti-theft action is performed including: (1) transmitting data regarding its location to a remote system to facilitate recover from a possible thief, or (2) impeding use of said electronic device;
    said executable code thereby protecting against distribution channel theft of the electronic devices.

20. The one or more media of claim 19, wherein the executable code further directs the computing system to store records of which of said electronic devices have had their loss protection clients legitimately disabled.

21. The one or more media of claim 19, wherein the executable code further directs the computing system to, during communication with said suspect electronic device, determine whether the suspect device has had its loss protection client improperly disabled.

* * * * *

UNITED STATES PATENT AND TRADEMARK OFFICE
CERTIFICATE OF CORRECTION

PATENT NO.       : 8,734,529 B2
APPLICATION NO.  : 13/584680
DATED            : May 27, 2014
INVENTOR(S)      : Jon Stevens Page 1 of 1

It is certified that error appears in the above-identified patent and that said Letters Patent is hereby corrected as shown below:

In the Specification

In column 3 at line 63, Change "reward," to --reward.--.

In column 8 at line 52, Change "in it" to --in its--.

In column 13 at line 5, Change "interne" to --internet--.

In the Claims

In column 14 at line 8, In Claim 1, change "recover" to --recovery--.

In column 15 at line 11, In Claim 12, change "recover" to --recovery--.

In column 16 at line 29, In Claim 19, change "recover" to --recovery--.

Signed and Sealed this
Thirty-first Day of March, 2015

Michelle K. Lee
*Director of the United States Patent and Trademark Office*